(12) United States Patent
Nakamura et al.

(10) Patent No.: US 6,275,520 B1
(45) Date of Patent: Aug. 14, 2001

(54) PSEUDO-NOISE GENERATING APPARATUS (75) Inventors: Takaharu Nakamura; Kazuo Kawabata; Kazuhisa Obuchi; Hajime Hamada, all of Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/198,199

(22) Filed: Nov. 23, 1998

(30) Foreign Application Priority Data

Feb. 18, 1998 (JP) .................................................. 10-035726

(51) Int. Cl.[7] ............................. H04B 1/707; H04L 7/08; H04L 7/10
(52) U.S. Cl. ..................... 375/149; 375/143; 375/142; 375/150; 375/152; 370/342
(58) Field of Search ................................. 375/142, 143, 375/149, 150

(56) References Cited

U.S. PATENT DOCUMENTS

| | | | |
|---|---|---|---|
| 5,228,054 | * 7/1993 | Rueth et al. ......................... | 375/200 |
| 5,519,736 | * 5/1996 | Ishida ................................... | 375/367 |
| 5,532,695 | * 7/1996 | Park et al. ........................... | 341/173 |
| 5,546,381 | * 8/1996 | Fukushima ........................... | 370/479 |
| 5,878,075 | * 3/1999 | Frank et al. ......................... | 375/200 |
| 5,926,070 | * 7/1999 | Barron et al. ........................ | 331/78 |
| 6,005,888 | * 12/1999 | Barron ................................ | 375/208 |
| 6,014,408 | * 1/2000 | Naruse et al. ................... | 364/717.01 |

OTHER PUBLICATIONS

Mutagi, R.N. "Pseudo Noise Sequences for Engineers" Electronics & Communication Engineering Journal, vol: 8 2, Apr. 1996, pp 79–87.*

* cited by examiner

Primary Examiner—Stephen Chin
Assistant Examiner—Paul N Rupert
(74) Attorney, Agent, or Firm—Helfgott & Karas, P.C.

(57) ABSTRACT

A pseudo-noise generating apparatus capable of starting a pseudo-noise sequence from an arbitrary phase using compact processing circuitry. Tap selection patterns corresponding to a plurality of phase shift amounts are stored in advance in a ROM. By giving a phase shift amount to the ROM and setting the corresponding tap selection pattern in AND gates, the pseudo-noise sequence generated by the pseudo-noise generator is shifted in phase, and is loaded into a shift register. After setting a new phase amount in the ROM, the contents of the shift register are transferred into a shift register in the pseudo-noise generator. By repeating this operation, the desired phase shift is accomplished as a sum of a plurality of phase shift amounts.

5 Claims, 12 Drawing Sheets

PSEUDO-NOISE GENERATING APPARATUS

BACKGROUND OF THE INVENTION

1. Field of the Invention

The present invention relates to a pseudo-noise generating apparatus for generating a pseudo-noise sequence used in the spreading modulation of a transmission signal in a CDMA (Code Division Multiple Access) communication system.

2. Description of the Related Art

In a CDMA communication system which uses a spreading code sequence whose period may extend to, for example, as much as several minutes, code synchronization must be established quickly by starting the spreading code sequence from the phase determined based on time data that the transmitting end sends through a control channel. Further, in a system in which a code sequence of a long period is divided into a plurality of sections each for use by a different station, it is required that the code sequence be quickly started from the phase to be used, and that when an assignment change request is issued to reduce mutual interference, the code sequence be restarted quickly from the assigned phase.

One possible method to arbitrarily set the phase of the pseudo-noise sequence used as a spreading code sequence is to supply a faster-than-usual clock to the pseudo-noise generator that generates the pseudo-noise sequence and shift its phase from the initial phase to the desired phase. This method, however, requires a high-speed clock to accomplish the shifting, and presents a problem particularly when the shift amount is large, because a very fast clock becomes necessary if the desired shift amount is to be obtained within a short time.

Another possible method is to utilize the shift additive nature of the pseudo-noise sequence and generate a phase-shifted code sequence by taking appropriate taps from the respective stages of a shift register in the pseudo-noise generator and EORing the tapped outputs. This method, however, has the problem that the tap positions for obtaining the desired shift amount must be determined by calculation and, if the number of shift register stages is large, it takes considerable time for calculation.

SUMMARY OF THE INVENTION

It is accordingly an object of the present invention to provide a pseudo-noise generating apparatus that can start from a desired phase in a short time.

According to the present invention, there is provided a pseudo-noise generating apparatus comprising: a pseudo-noise generator having a plurality of delay elements connected in series; a memory device for storing a selection pattern corresponding to a phase shift amount; a selector for selecting delay element outputs in the pseudo-noise generator in accordance with the selection pattern output from the memory device; and an adder for adding the delay element outputs selected by the selector, thereby outputting a phase-shifted version of a pseudo-noise sequence output from the pseudo-noise generator.

Preferably, the memory device stores a plurality of selection patterns corresponding to a plurality of different phase shift amounts, and outputs a selection pattern corresponding to one phase shift amount specified from among the plurality of phase shift amounts.

Preferably the apparatus further comprises: a shift register for accumulating therein the pseudo-noise sequence that the adder outputs; and a controller for accomplishing a desired phase shift as a sum of a plurality of phase shift amounts by issuing specification of a phase shift amount to the memory device and by transferring the pseudo-noise sequence accumulated in the shift register into the delay elements in the pseudo-noise generator.

DESCRIPTION OF THE PREFERRED EMBODIMENTS

In the embodiments hereinafter described, like reference numerals designate like constituent parts.

Figure 1:
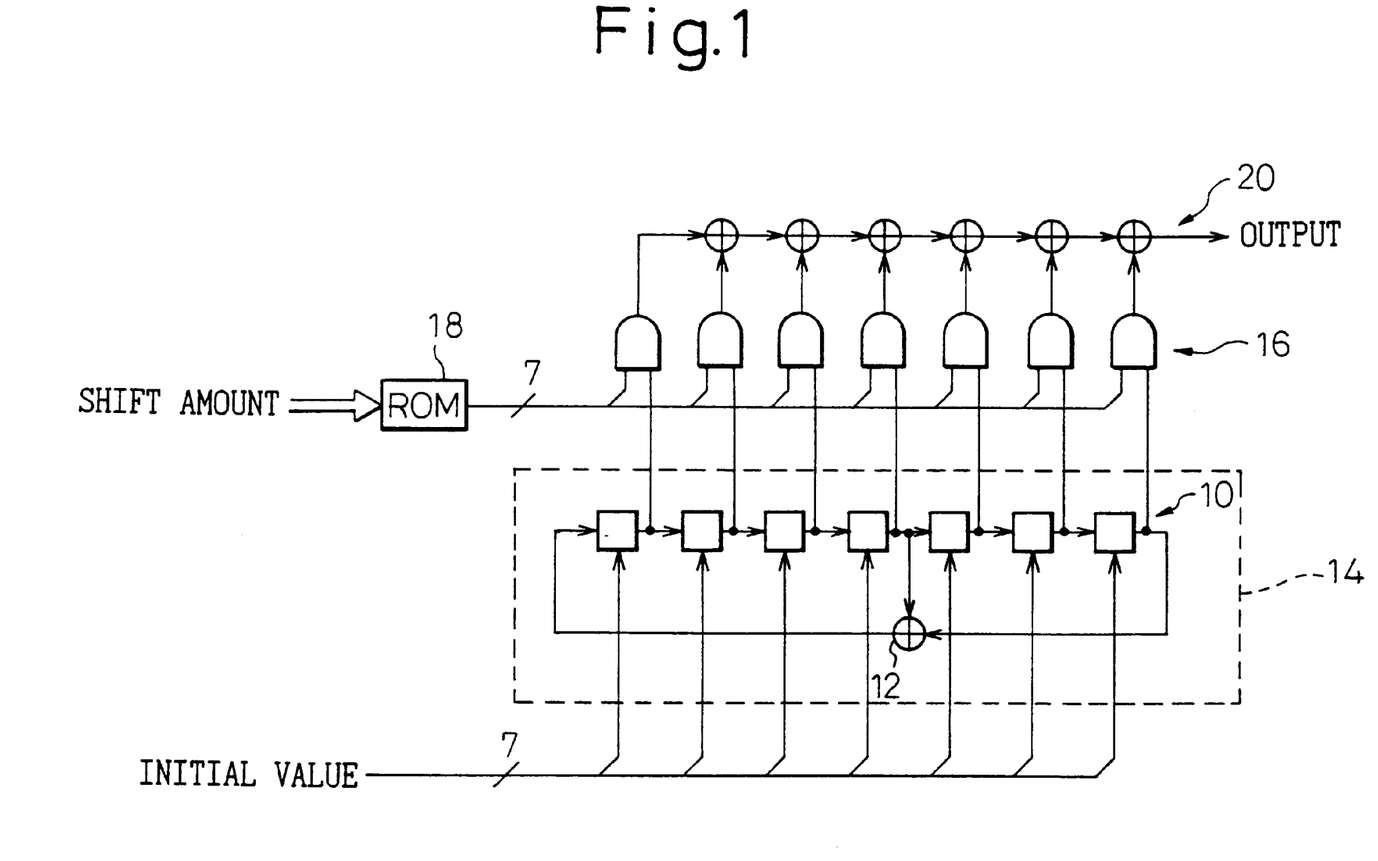
FIG. 1 is a circuit diagram of a pseudo-noise generating apparatus according to a first embodiment of the present invention.

FIG. 1 is a circuit diagram of a pseudo-noise generating apparatus according to a first embodiment of the present invention.

In FIG. 1, a seven-stage shift register 10 and an EOR circuit 12, which generates the logical exclusive OR (EOR) of the outputs of the fourth and seventh stages of the shift register 10 and feeds the result back to the first stage input, constitute a pseudo-noise generator 14 which generates an M-sequence of period $2^7-1$. The output of each stage of the shift register 10 is coupled to one input of one of seven AND gates 16 whose other inputs are coupled to an output of a ROM 18. All the outputs of the AND gates 16 are EORed by six EOR circuits 20 to produce the output of this apparatus.

As previously described, because of the shift additive nature of an M-sequence, by taking appropriate taps from the respective stages of the shift register and EORing the tapped outputs, an M-sequence can be obtained with the phase of a code sequence shifted arbitrarily. Utilizing this property, in the present invention, tap position selection patterns that provide desired shift amounts are precalculated, and each pattern is prestored in the storage location in the ROM 18 that is addressed by the corresponding shift amount.

After applying an initial value to each stage of the shift register 10, a desired shift amount is given as an address to the ROM 18 which in response outputs a tap position selection pattern that provides the desired shift amount. In accordance with the selection pattern output from the ROM 18, appropriate AND gates 16 are opened to select the tap positions, and the values from the selected taps are EORed in the EOR circuit 20, which thus outputs an M-sequence shifted from the initial value by the desired shift amount, that is, an M-sequence with the desired phase.

In the embodiment of FIG. 1, in the case of a pseudo-noise generator having, for example, a 41-stage shift register and outputting an M-sequence of period $2^{41}-1$, if an arbitrary shift amount is to be obtained, $(2^{41}-2) \times 41$ bits of ROM capacity would be needed, which is not realistic.

Figure 2:
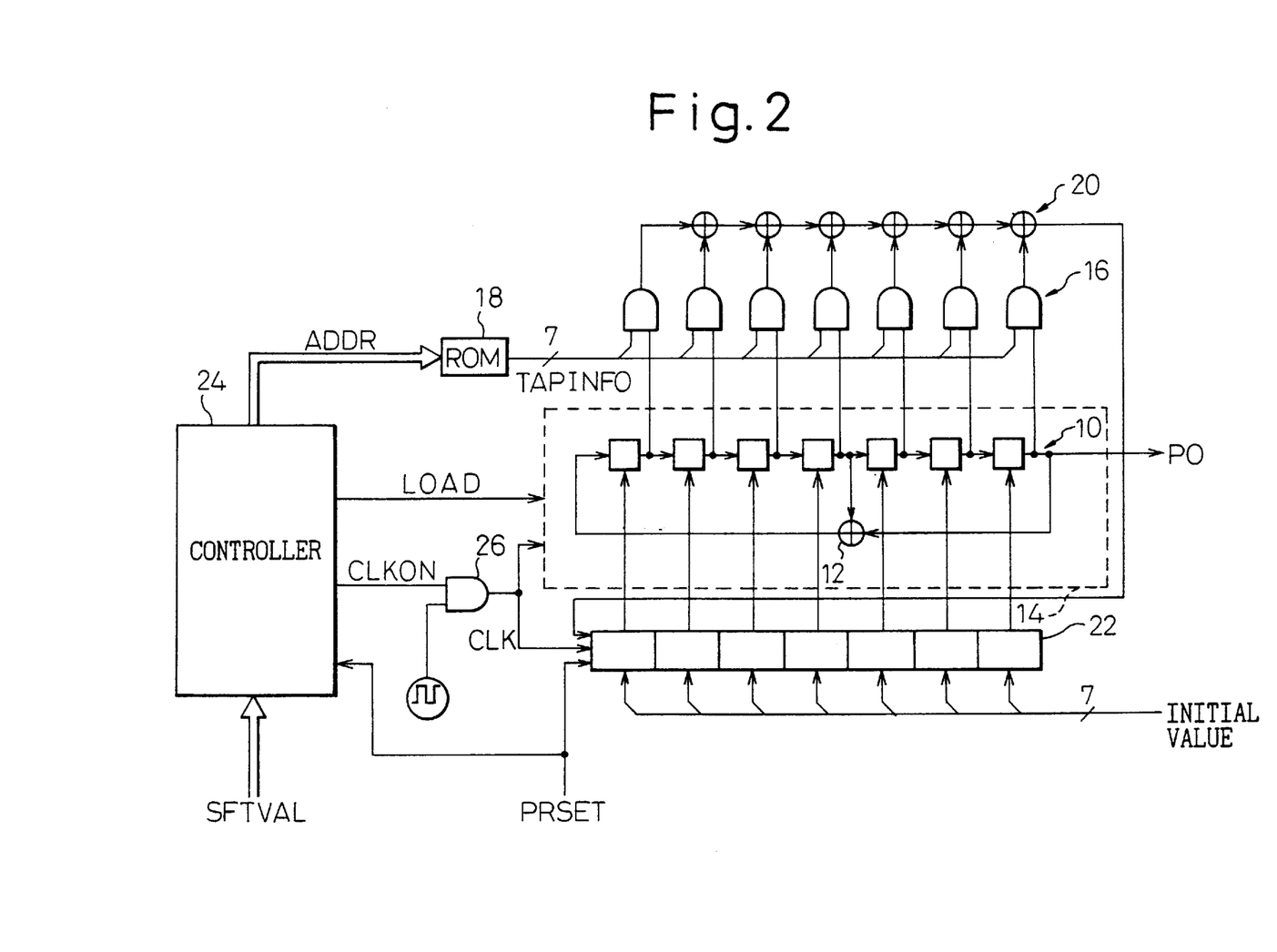
FIG. 2 is a circuit diagram of a pseudo-noise generating apparatus according to a second embodiment of the present invention.

FIG. 2 is a circuit diagram of a pseudo-noise generating apparatus according to a second embodiment of the present invention. In FIG. 2 and the examples hereinafter given, a pseudo-noise generator 14 having a seven-stage shift register and outputting an M-sequence of period $2^7-1$, as depicted in FIG. 1, is shown to facilitate understanding, but it will be appreciated that the embodiment hereinafter described is equally applicable to the case of a pseudo-noise generator having, for example, a 41-stage shift register and outputting an M-sequence of period as long as $2^{41}-1$.

In the present embodiment, a phase-shifted M-sequence being output from the EOR circuit 20 is serially input into a shift register 22, and when loaded with data equal to the number of stages of the shift register 10 in the pseudo-noise generator 14, the shift register 22 transfers the data back into the shift register 10. In this way, the desired phase shift amount can be obtained as a sum of a plurality of phase shift amounts. Further, by setting the ROM 18 with phase shift amounts corresponding to ½, ¼, ⅛, . . . of the period of the pseudo-noise sequence, an arbitrary shift amount can be obtained efficiently within a limited time. To be more specific, when the period of the M-sequence is $2^n-1$, tap selection patterns corresponding to the phase shift amounts of $2^{n-1}, 2^{n-2}, \ldots, 2,$ and 1 are stored in the ROM 18, and by adding shift amounts in accordance with the bit pattern of a desired shift amount expressed in binary, any desired shift amount can be obtained. The required ROM capacity in this case is only n×n bits. By performing the above operation after setting the initial value, an M-sequence with the desired phase can be obtained within a short time. If the number of necessary phases is limited, just a sufficient number of patterns that can express the necessary phases by their sums need be stored in the ROM 18. For example, when the phase desired to be generated is 0, 4, 16, 64, 68 or 80, then the ROM 18 need only store selection patterns corresponding to the phase shift amounts 64, 16, and 4, since all the necessary phases can be expressed by their sums.

Figure 3:
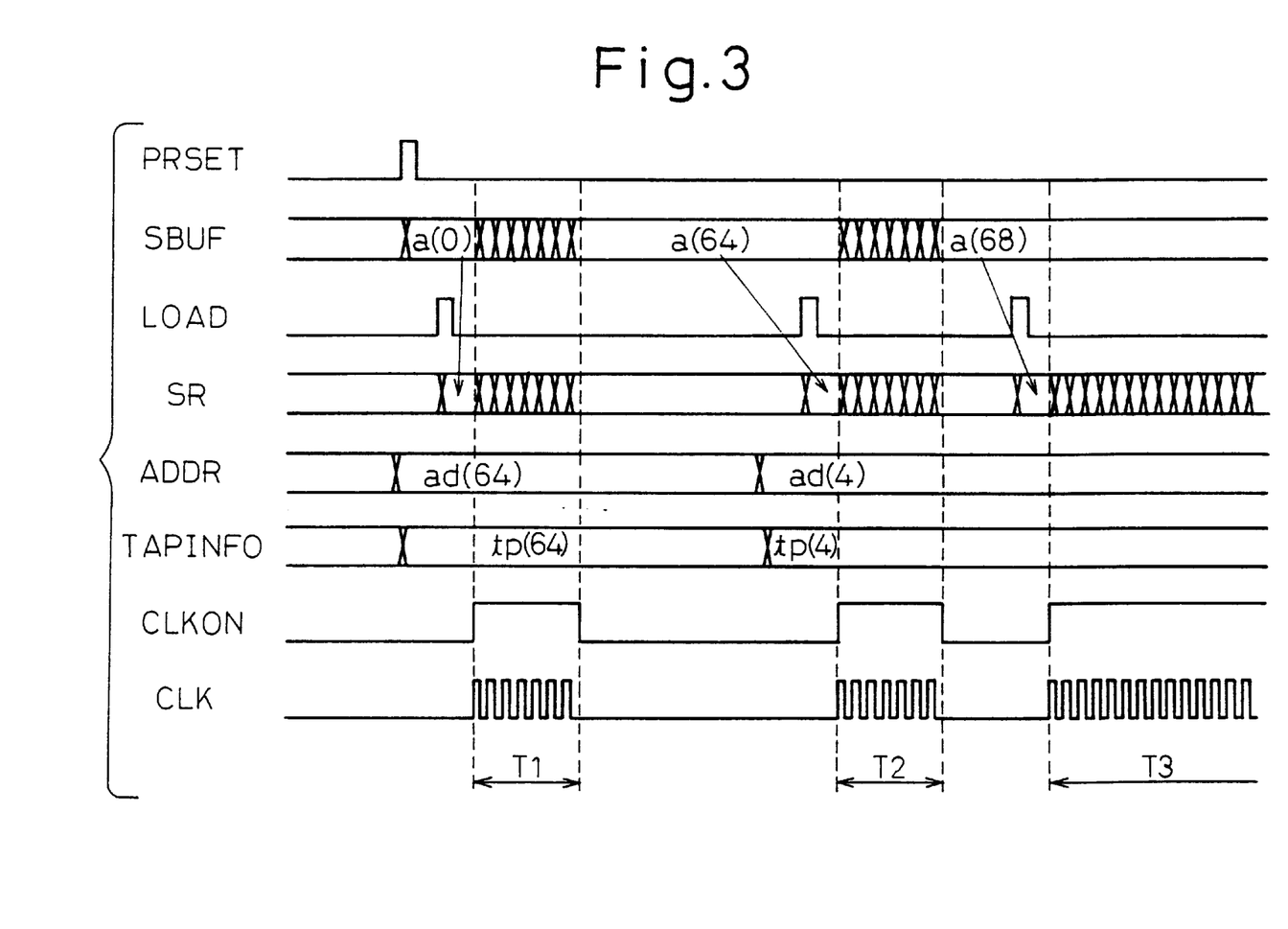
FIG. 3 is a timing chart for explaining the operation of the circuit of FIG. 2.

Referring to the timing chart of FIG. 3, the operation of the circuit of FIG. 2 will be described by taking an example in which the M-sequence of period 127 (=$2^7-1$) is output with its phase advanced (or delayed) by 68 clocks from the initial value. Essentially the same operation applies to the case of an M-sequence generating circuit having period as long as $2^{41}-1$.

When an initial setting pulse PRSET is applied to the shift register 22, the shift register 22 is set to the initial value a(0). SBUF in FIG. 3 shows the value that is set in the shift register 22. The initial setting pulse PRSET is also applied to a controller 24. By this pulse, the controller 24 latches a phase shift value SFTVAL, determines a combination of 64+4 as the combination to achieve the phase shift value 68 by one of the methods described later, and gives the ROM 18 the storage address ad(64) of the selection pattern corresponding to the 64-clock phase-shift value (see ADDR in FIG. 3). In response, the ROM 18 outputs the selection pattern tp(64) of tap values that achieve the phase shift of 64 clocks (see TAPINFO in FIG. 3). After that, the controller 24 outputs a load pulse LOAD, upon which the initial value a(0) loaded in the shift register 22 is transferred into the shift register 10 (see SBUF and SR). When signal CLKON is set at the H level for a period of seven clocks in period T1, an AND gate 26 is opened and a shift clock CLK is applied seven times to the shift registers 10 and 22. With the application of the seven shift clocks, the pseudo-noise generator 14 outputs a seven-bit M-sequence, while at the same time, a value a(64) advanced (or delayed) by 64 clocks from the output of the generator 14 is loaded into the shift register 22 (see SBUF). Next, the controller 24 outputs an address ad(4) corresponding to the phase shift amount of four clocks (ADDR), in response to which the ROM 18 outputs the corresponding tap position selection pattern tp(4) (TAPINFO). In this condition, when a(64) is loaded into the shift register 10 (SBUF, SR) by application of the load pulse LOAD, and seven shift clocks are applied to the shift registers 10 and 22 in period T2, a value a(68) whose phase is advanced (or delayed) by 64+4 clocks from the initial value a(0) is loaded into the shift register 22. The output of the adder 20 may be derived as the desired pseudo-noise sequence by continuing to apply the shift clock CLK. In the illustrated example, the value a(68) is transferred into the shift register 10 by the application of the load pulse LOAD, and the shift clock CLK is applied successively in period T3, thus causing the pseudo-noise sequence generator 14 to output the pseudo-noise sequence with the desired phase.

Figure 4:
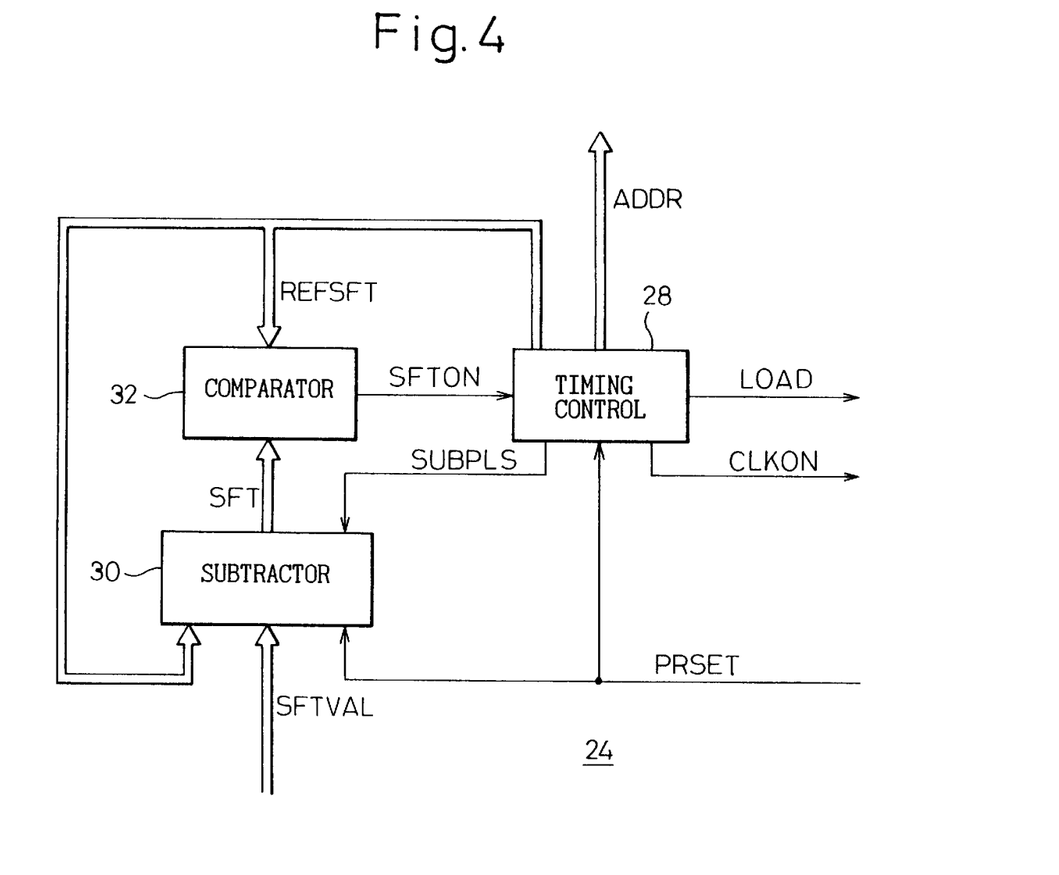
FIG. 4 is a circuit block diagram showing a first example of a controller 24 in FIG. 2.
Figure 5:
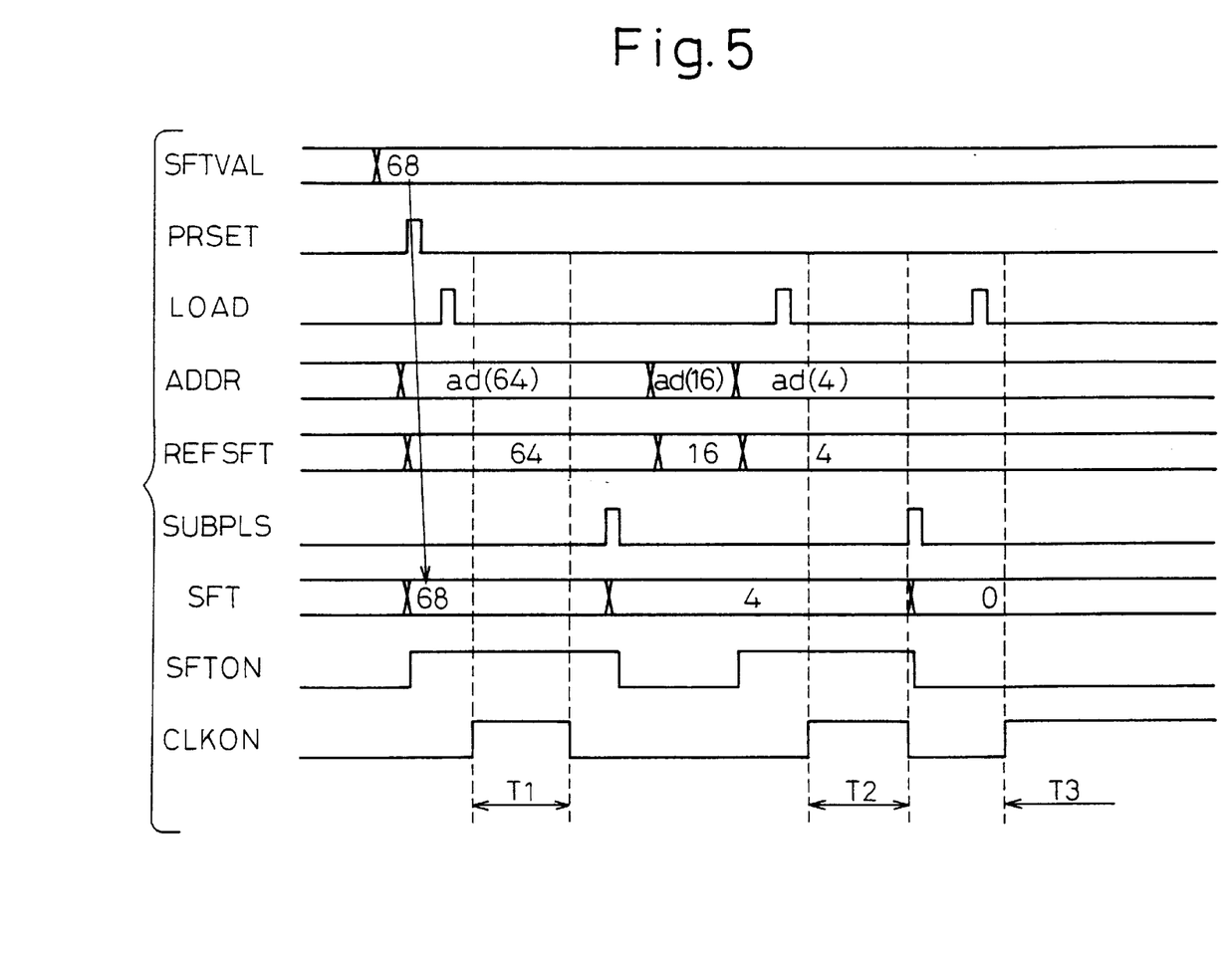
FIG. 5 is a timing chart for explaining the operation of the circuit of FIG. 4.

FIG. 4 is a circuit block diagram showing a first example of the controller 24 in FIG. 2. The example of FIG. 4 achieves a phase shift of 0, 4, 16, 64, 68, or 80 by storing selection patterns corresponding to the phase shift amounts of 64, 16, and 4 in the ROM 18 and by taking their sums, as previously described. As an example, the timing chart of the operation to achieve a phase difference of 68 clocks is shown in FIG. 5.

When the initial setting pulse PRSET is applied to a timing controller 28, the timing controller 28 outputs the storage address ad(64) of the tap selection pattern corresponding to the phase shift amount of 64 clocks (ADDR) together with a value 64 (REFSFT). Further, with the application of the initial setting pulse PRSET, the shift value 68 is latched into a subtractor 30 and is output (SFT). In a comparator 32, the value 64 (REFSFT) is compared with the value 68 (SFT) output from the subtractor 30; since SFT is larger than REFSFT, shift-on signal SFTON goes to the H level. When SFTON is at the H level, the timing controller 28 outputs the load pulse LOAD, as a result of which CLKON is set at the H level for period T1. This causes a (64) shifted by 64 clocks from the initial value a(0) to be loaded into the shift register 22, as earlier described. Next, the timing controller 28 outputs a subtraction pulse SUBPLS, in response to which the subtractor 30 performs the calculation 68−64 and outputs the result 4 (SFT). After that, the timing controller 28 outputs ad(16) (ADDR) and value 16 (REFSFT), but since 4 (SFT)<16 (REFSFT), the signal SFTON output from the comparator 32 goes to the L level. In this case, the timing controller 28 does not output the pulse LOAD, but outputs the next address value ad(4) (ADDR) and value 4 (REFSFT). Since REFSFT=SFT, the signal SFTON now goes to the H level, and the pulse LOAD and signal CLKON are output, so that a phase shift of shift amount 4 is carried out. Since the processing has been completed for all the three selection patterns stored in the ROM, the timing controller 28 applies the load pulse LOAD to the shift register 10 to load the result of the above processing into the pseudo-noise generator 14, and sets the clock-on signal to the H level in period T3 to start the operation of the pseudo-noise generator 14.

Figure 6:
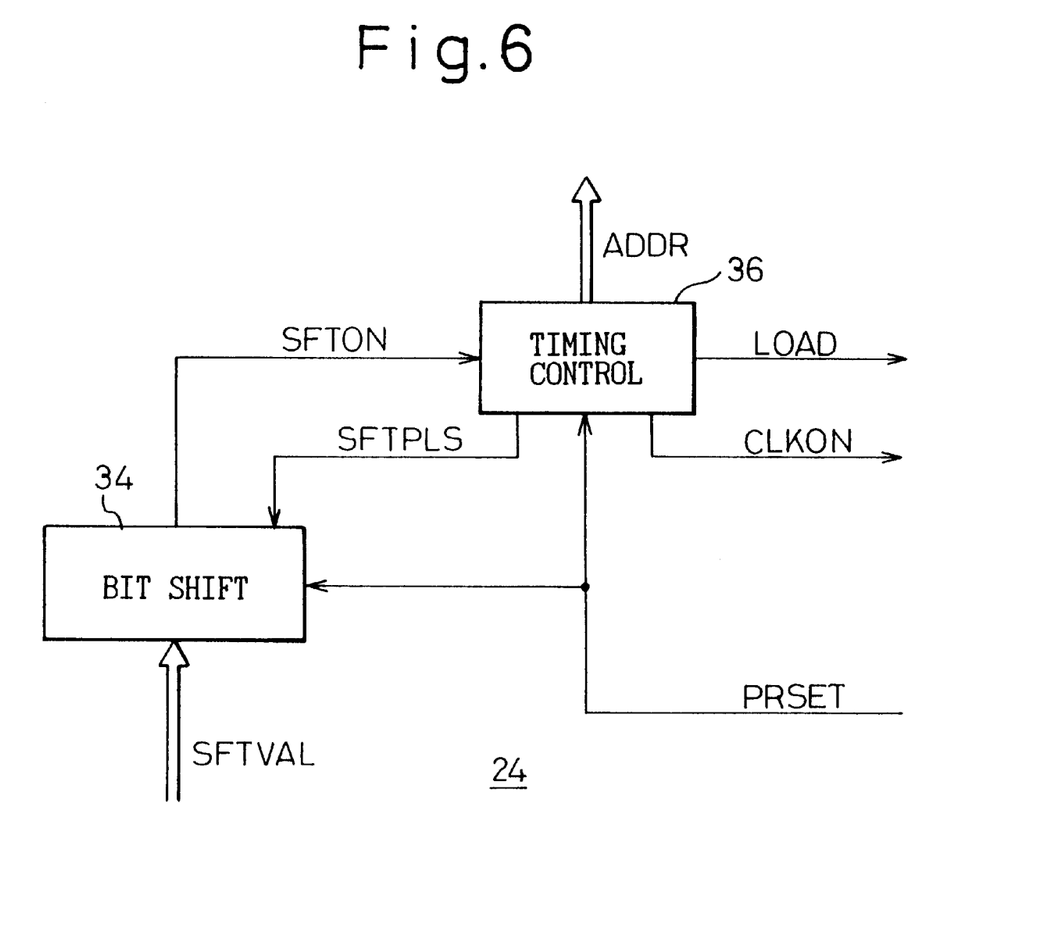
FIG. 6 is a circuit block diagram showing a second example of the controller 24 in FIG. 2.

FIG. 6 shows a second example of the controller 24. In this example, to obtain a pseudo-noise sequence of period $2^7-1=127$ with an arbitrary phase, selection patterns corresponding to the phase shift amounts of 64, 32, 16, . . . , 2, and 1 are prestored in the ROM 18 (FIG. 2). The desired phase shift amount expressed as a binary number is examined in sequence starting from the most significant bit, and when the MSB is a 1, the address of the selection pattern corresponding to the phase shift amount corresponding to that bit position is given to the ROM 18 to achieve the arbitrary phase.

Figure 7:
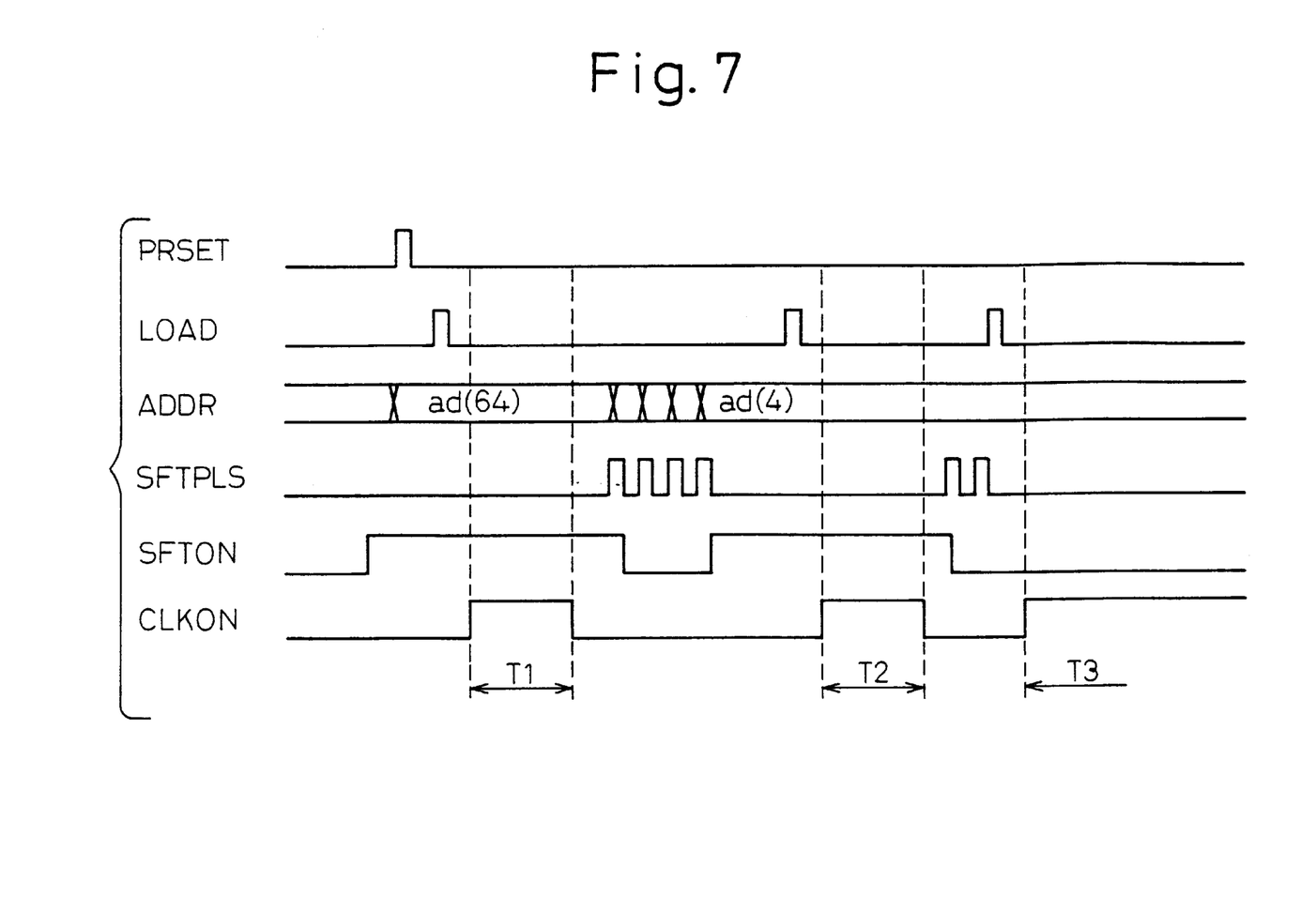
FIG. 7 is a timing chart for explaining the operation of the circuit of FIG. 6.

FIG. 7 shows a timing chart illustrating the operation when providing a 68-clock phase shift. By the application of the initial setting pulse PRSET, the phase shift value SFTVAL is latched into a bit shifter 34, and a timing controller 36 outputs ad(64). In binary notation, 68 is expressed as 1000100. Since the most significant bit is a 1, the shift-on signal SFTON goes to the H level. In this case, the timing controller 36 outputs the load pulse LOAD and clock-on signal CLKON, so that a phase shift of 64 clocks is performed. Next, the timing controller 36 outputs ad(32) and also a shift pulse SFTPAL, causing the value in the bit shifter 34 to be shifted upward by one bit. Since the most significant bit is now a 0, SFTON goes to the L level, and neither LOAD nor CLKON is output. When ADDR becomes ad(4), SFTON goes to the H level, so that LOAD and CLKON are output and a phase shift of four clocks is performed. When all the bits have been examined, the load pulse LOAD is output and CLKON is fixed to the H level so that a pseudo-noise sequence with the desired phase is output continuously.

In the illustrated example, the bits are examined in sequence starting from the most significant bit, but it is of course possible to examine the bits starting from the least significant bit and to carry out the corresponding shift when a bit 1 is detected.

Furthermore, when the necessary shift amount is limited to 4, 16, 64, 68, or 80, as previously described, it is only necessary to store three selection patterns tp(4), tp(16), and tp(64) and to examine the designated three bit positions of the phase shift value SFTVAL.

Figure 8:
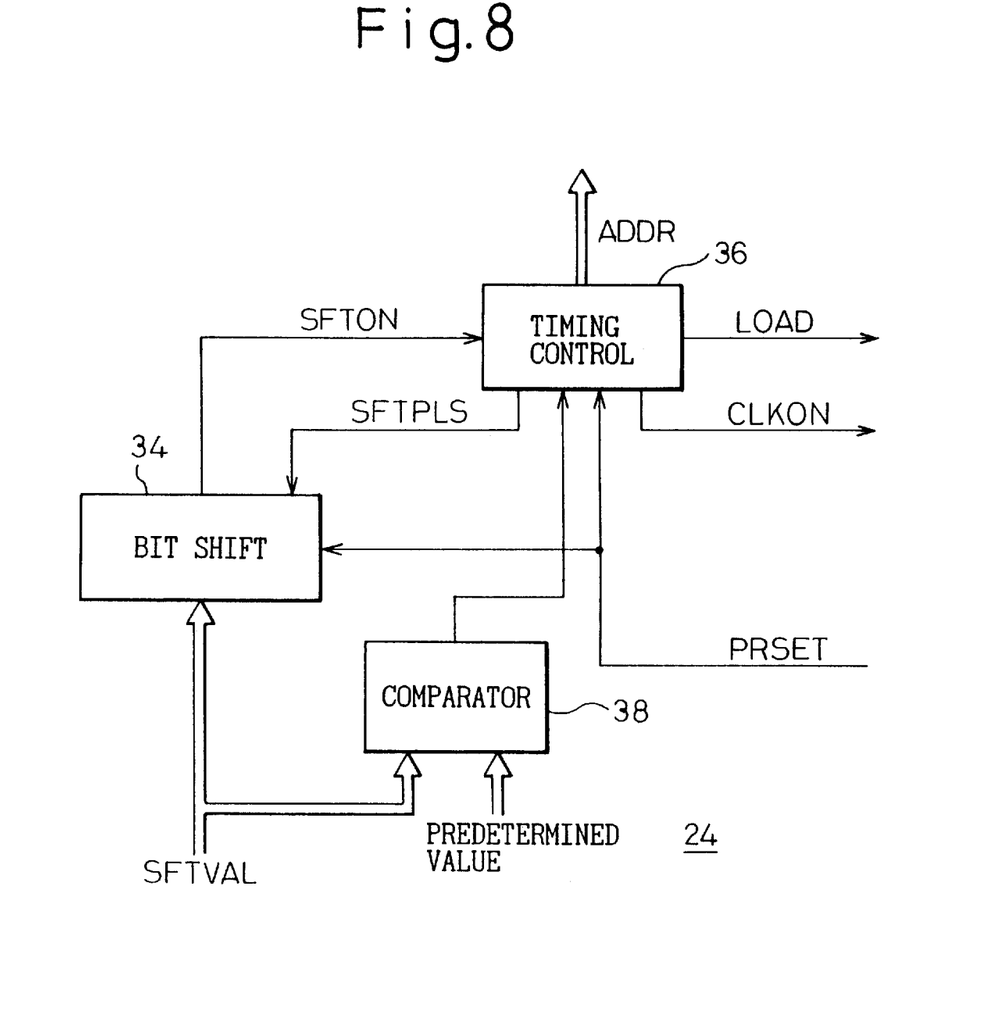
FIG. 8 is a circuit block diagram showing a third example of the controller 24 in FIG. 2.

The phase shift performed by giving ad(4) to the ROM 18 requires outputting seven shift clocks and the load pulse LOAD. Instead, by just applying four shift clocks to the shift register 10 in the pseudo-noise generator 14, the phase shift of four clocks can be accomplished. That is, when the phase shift amount is not larger than the number of stages of the shift register 10, the processing time can be shortened by just applying the necessary number of shift clocks to the shift register 10. Further, as shown in FIG. 8, a comparator 38 compares the supplied shift value SFTVAL with a predetermined value, for example, the number of stages, n, of the shift register, and if the shift value is not larger than the predetermined value, the clock-on signal CLKON is set to the H level only for the corresponding time, thereby generating the necessary number of shift clocks. By so doing, the desired phase can be obtained in a short time.

Figure 9:
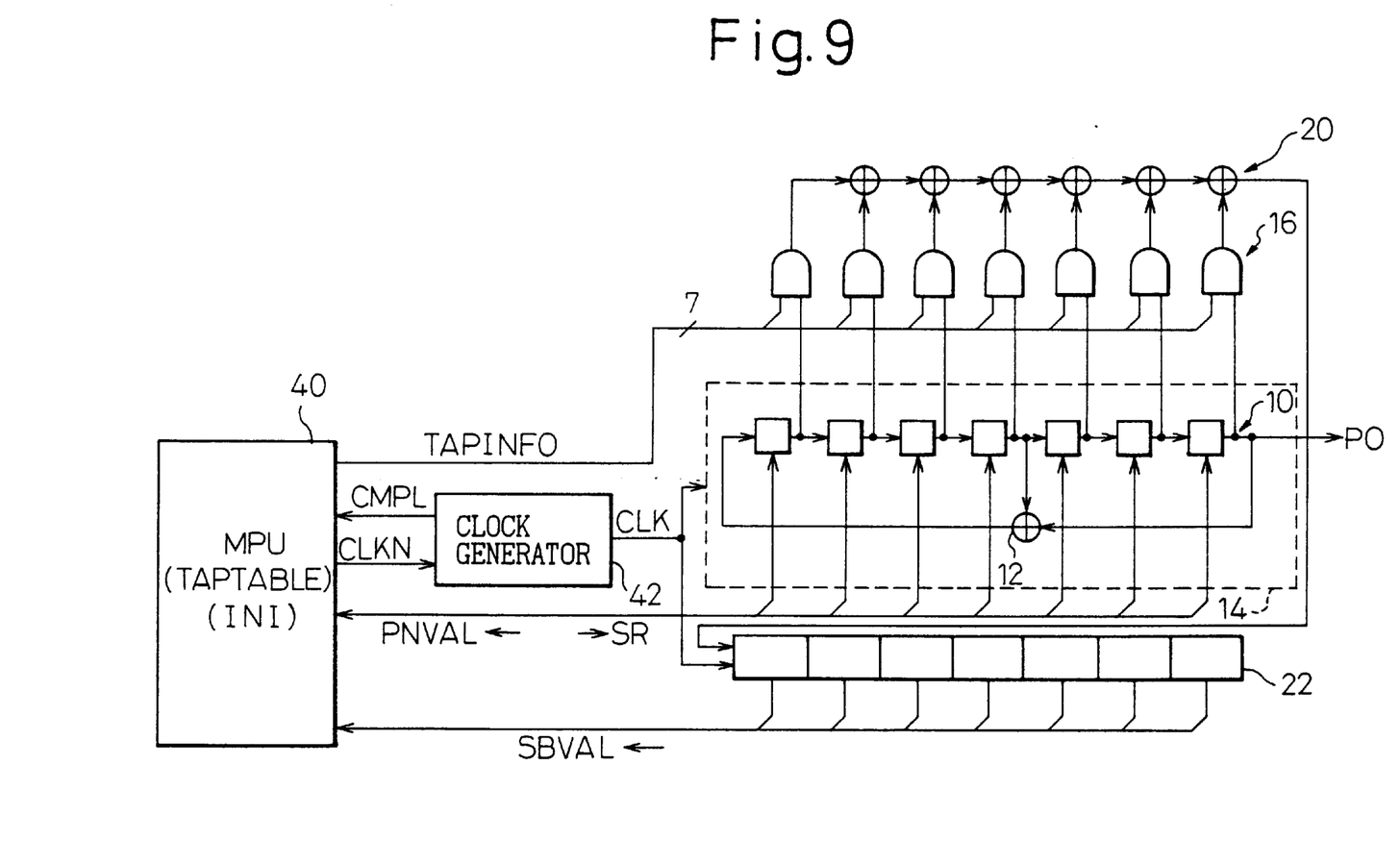
FIG. 9 is a circuit block diagram showing a fourth example of the controller 24 in FIG. 2.

FIG. 9 shows an example in which the controller 24 is implemented by a microcomputer 40 comprising an MPU (Micro Processor Unit), memory, etc. Table TAPTABLE having the same function as the ROM 18 is contained in the memory of the microcomputer 40. By referring to this table, the MPU can supply the tap selection pattern TAPINFO directly to the AND gates 16. Further, the microcomputer 40 can read the value SBVAL of the shift register 22, can load the value SR into the shift register 10, and can read the value PNVAL from the shift register 10. A clock generator 42, when supplied with a shift clock number CLKN from the microcomputer 40, supplies the shift clock CLK to the shift registers 10 and 22 and, after having output the specified number of shift clocks, sets completion signal CMPL active and returns it to the microcomputer 40.

Figure 10:
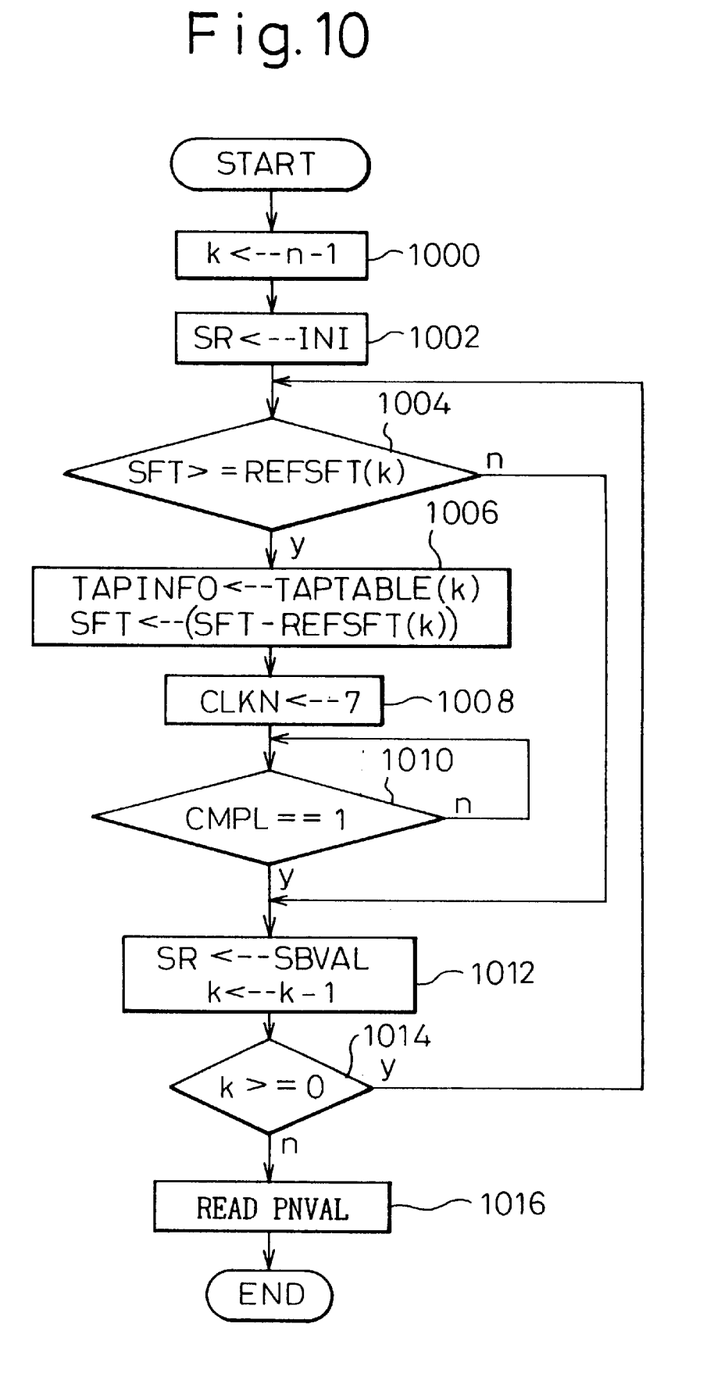
FIG. 10 is a flowchart illustrating a first example of the operation of a microcomputer 40 in FIG. 9.

FIG. 10 shows a first example of the operation of the microcomputer 40. This example corresponds to the example described with reference to FIGS. 4 and 5. First, a value (n−1) for executing the loop n times is substituted into a loop variable k (step 1000). Next, the shift register 10 is set to the initial value INI (step 1002). To determine whether the shift specified by the k-th tap information TAPINFO(k) in the tap information table (TAPTABLE) is to be performed or not, its shift amount REFSFT(k) is compared with the remaining shift amount SFT (step 1004). If the remaining shift amount signal SFT is larger than or equal to the shift amount SFT, TAPINFO(k) is set in the AND gates 16 and the phase shift amount signal REFSFT(k) is subtracted from the remaining shift amount signal SFT (step 1006) before initiating the shift operation. To perform the shift by an amount equal to the number of stages of the shift register 10, a value of 7 is set in the signal CLKN that specifies the number of clocks to be generated (step 1008). Upon receiving the clock output completion signal CMPL from the clock generator 42 (step 1010), the contents SBVAL of the shift register 22 are read out and transferred into the shift register 10 and the loop variable is decremented (step 1012); if the specified number of loops is not completed yet (step 1014), the process returns to step 1004. When the specified number of loops has been completed, the contents PNVAL of the shift register 10 are read out to complete the operation (step 1016). Here, if, instead of reading out PNVAL, an instruction is issued to the clock generator 42 to continue to generate the shift clock CLK, the pseudo-noise sequence can be output continuously at terminal PO.

Figure 11:
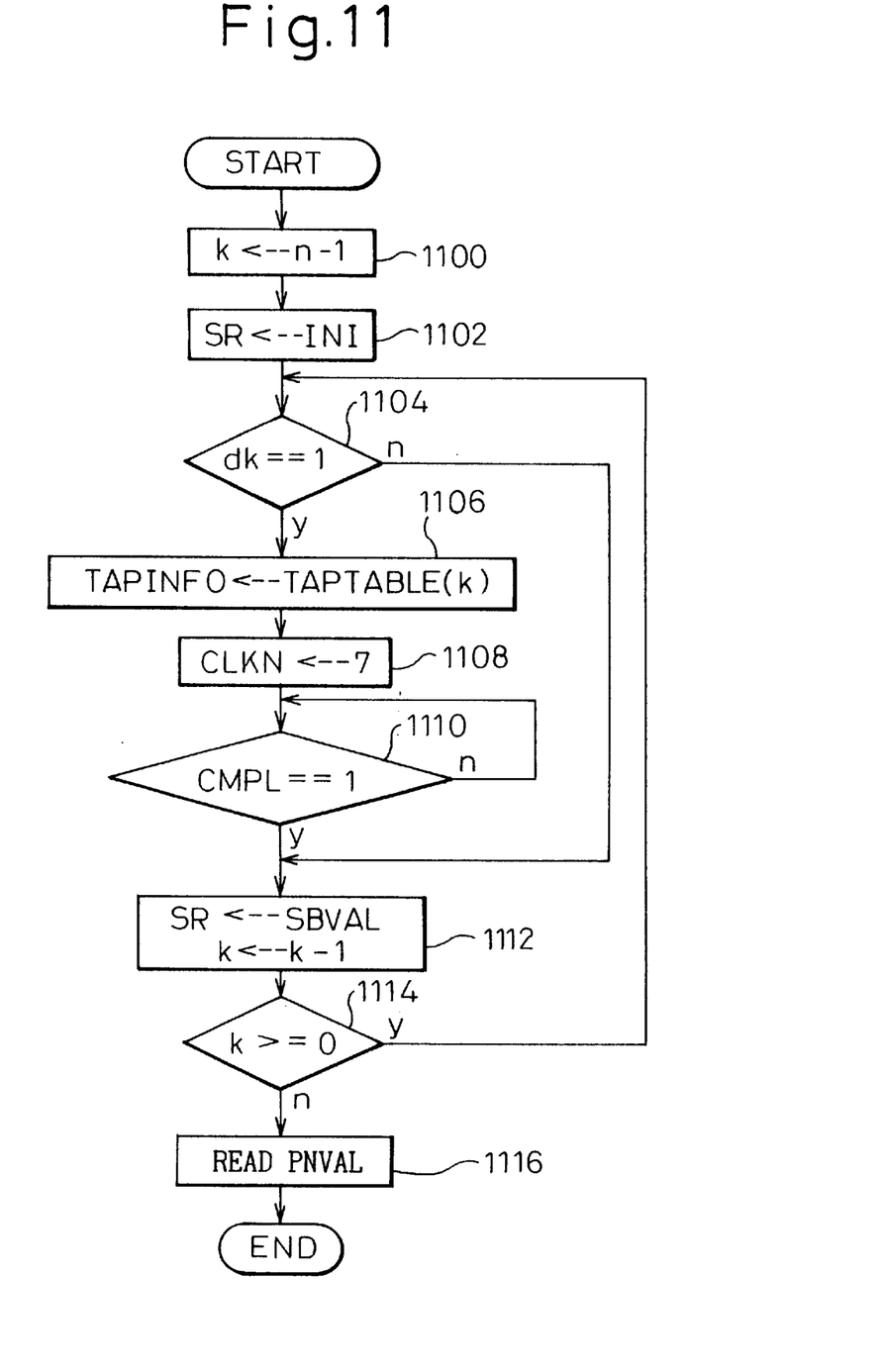
FIG. 11 is a flowchart illustrating a second example of the operation of the microcomputer 40 in FIG. 9.

FIG. 11 shows a second example of the operation of the microcomputer 40. This example corresponds to the example described with reference to FIGS. 6 and 7. First, the value (n−1) for executing the loop n times is substituted into the loop variable k (step 1100). Next, the shift register 10 is set to the initial value INI (step 1102). To determine whether the shift specified by the k-th tap information TAPINFO(k) in the tap information table (TAPTABLE) is to be performed or not, the k-th bit dk of the shift amount signal SFT is examined to see if the bit is set or not (step 1104). If the bit is set, TAPINFO(k) is set in the AND gates 16 (step 1106) before initiating the shift operation. In this example, to perform the shift by an amount equal to the number of stages of the shift register 10, a value of 7 is set in the signal CLKN that specifies the number of clocks to be generated (step 1108). Upon receiving the clock output completion signal CMPL from the clock generator 42 (step 1110), the contents SBVAL of the shift register 22 are transferred into the shift register 10 and the loop variable is decremented (step 1112); if the specified number of loops is not completed yet (step 1114), the process returns to step 1104. When the specified number of loops has been completed, the contents PNVAL of the shift register 10 are read out to complete the operation (step 1116). Here, if, instead of reading out PNVAL, an instruction is issued to the clock generator 42 to continue to generate the shift clock CLK, the pseudo-noise sequence can be output continuously at terminal PO.

Figure 12:
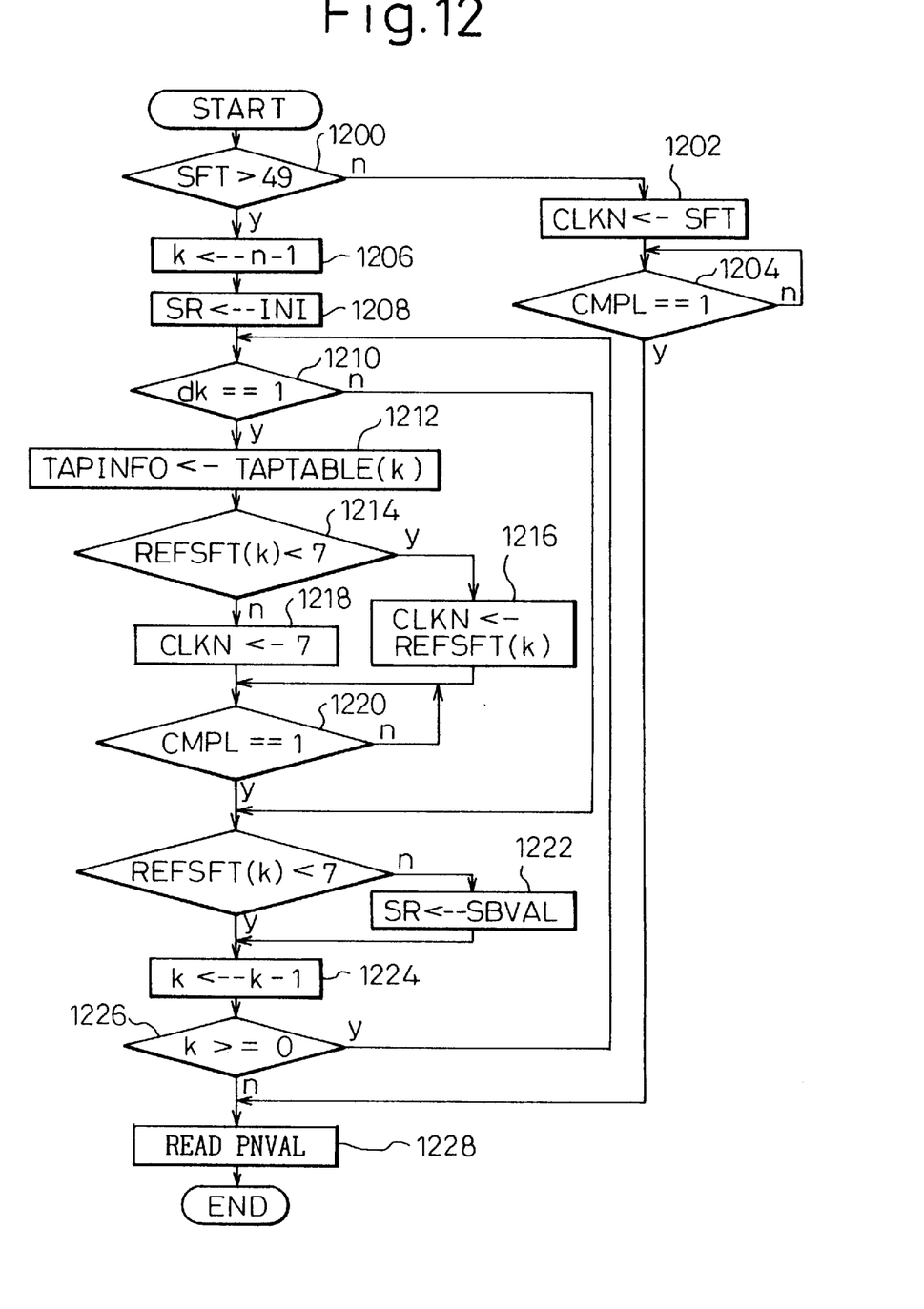
FIG. 12 is a flowchart illustrating a third example of the operation of the microcomputer 40 in FIG. 9.

FIG. 12 shows a third example of the operation of the microcomputer 40. This example corresponds to the example described with reference to FIG. 8. First, if the total shift amount given as the remaining shift amount signal SFT is not greater than a predetermined value (in the illustrated example, 49) (step 1200), the branch to the right is followed, where the necessary number of clocks to be generated is set in the signal CLKN that specifies the number of clocks to be generated (step 1202), and when the shift of the specified number of clocks has been completed, the shift operation is complete (step 1204). Otherwise, the value (n−1) for executing the loop n times is substituted into the loop variable k (step 1206). Next, the shift register 10 is set to the initial value INI (step 1208). To determine whether the shift specified by the k-th tap information (TAPINFO(k)) in the tap information table (TAPTABLE) is to be performed or not, the k-th bit dk of the shift amount signal SFT is examined to see if the bit is set or not (step 1210). If the bit is set, TAPINFO(k) is set in the AND gates 16 (step 1212) before initiating the shift operation. Here, (a) if the value of REFSFT(k) is smaller than the number of stages, 7, of the shift register 10 (step 1214), the number of clocks equal to REFSFT(k) is set in the signal CLKN that specifies the number of clocks to be generated (step 1216); (b) otherwise, the value of 7 is set in the signal CLKN (step 1218), to perform the shift by an amount equal to the number of stages of the shift register 10. Upon receiving the clock output completion signal CMPL from the clock generator 42 (step 1220), the contents SBVAL of the shift register 22 are transferred into the shift register 10 only in the case of (b) (step 1222). Next, the loop variable is decremented (step 1224), and if the specified number of loops is not completed yet (step 1226), the process returns to step 1210. When the specified number of loops has been completed, the contents PNVAL of the shift register 10 are read out to complete the operation (step 1228). Here, if, instead of reading out PNVAL, an instruction is issued to the clock generator 42 to continue to generate the shift clock CLK, the pseudo-noise sequence can be output continuously at terminal PO.

According to the present invention, a pseudo-noise sequence whose phase is shifted by a predetermined amount or an arbitrary amount can be obtained using high-speed and compact processing circuitry.

What is claimed is:

1. A pseudo-noise generating apparatus comprising:
   a pseudo-noise generator having a plurality of delay elements connected in series:
     a memory device for storing a plurality of selection patterns corresponding to a plurality of different phase shift amounts, and outputting a selection pattern corresponding to one phase shift amount specified from among said plurality of phase shift amounts;
     a selector for selecting delay element outputs in said pseudo-noise generator in accordance with said selection pattern output from said memory device;
     an adder for adding said delay element outputs selected by said selector, thereby outputting a phase-shifted version of a pseudo-noise sequence output from said pseudo-noise generator;
     a shift register for storing therein said pseudo-noise sequence that said adder outputs; and
     a controller for accomplishing a desired phase shift as a sum of a plurality of phase shift amounts by issuing specification of a phase shift amount to said memory device and by transferring said pseudo-noise sequence stored in said shift register into said delay elements in said pseudo-noise generator.

2. A pseudo-noise generating apparatus according to claim 1, wherein said memory device stores at least selection patterns corresponding to a phase shift amount equivalent to one half of the period of said pseudo-noise sequence output from said pseudo-noise generator, a phase shift amount equivalent to one half of said one half, and a phase shift amount equivalent to further one half thereof.

3. A pseudo-noise generating apparatus according to claim 2, wherein said memory device stores at least selection patterns corresponding to phase shift amounts of $2^{n-1}$, $2^{n-2}$, and $2^{n-3}$ when the period of said pseudo-noise sequence output from said pseudo-noise generator is $2^n-1$.

4. A pseudo-noise generating apparatus according to claim 1, wherein when the phase shift amount to be specified to said memory device is less than a predetermined value, said controller supplies said pseudo-noise generator with clocks corresponding in number to said phase shift amount, instead of adding the phase shift amounts by transferring the contents of said shift register into said delay elements in said pseudo-noise generator.

5. A pseudo-noise generating apparatus according to claim 1, wherein when the amount of said desired phase shift is less than a predetermined value, said controller supplies said pseudo-noise generator with clocks corresponding in number to said desired phase shift, instead of accomplishing said desired phase shift by transferring the contents of said shift register into said delay elements in said pseudo-noise generator.

* * * * *